United States Patent
Schaedler

[19]

[11] Patent Number: 6,035,959
[45] Date of Patent: Mar. 14, 2000

[54] VACUUM ACTUATED POWER STEERING SYSTEM

[75] Inventor: Axel Schaedler, North Royalton, Ohio

[73] Assignee: MTD Products Inc, Cleveland, Ohio

[21] Appl. No.: 09/078,922

[22] Filed: May 14, 1998

Related U.S. Application Data

[63] Continuation-in-part of application No. 08/936,372, Sep. 24, 1997.
[60] Provisional application No. 60/053,723, Jul. 25, 1997.

[51] Int. Cl.[7] .................................. B62D 5/08; B62D 5/06
[52] U.S. Cl. ........................................... 180/441; 180/417
[58] Field of Search .................................... 180/417, 441, 180/437, 438

[56] References Cited

U.S. PATENT DOCUMENTS

| | | | |
|---|---|---|---|
| Re. 34,057 | 9/1992 | Middlesworth | 180/6.2 |
| 2,053,272 | 9/1936 | Eaton | 180/431 |
| 2,112,962 | 4/1938 | Hug | 180/417 |
| 2,624,533 | 1/1953 | Brader | 244/50 |
| 3,029,891 | 4/1962 | Price | 180/271 |
| 3,057,429 | 10/1962 | Quayle | 180/431 |
| 3,656,595 | 4/1972 | Gethmann et al. | 192/13 R |
| 3,901,342 | 8/1975 | Nunn, Jr. | 180/407 |
| 3,908,345 | 9/1975 | Oni et al. | 56/208 |
| 4,325,447 | 4/1982 | Dauvergne | 180/417 |
| 4,364,301 | 12/1982 | Kawabata et al. | 91/20 |
| 4,388,856 | 6/1983 | Cook | 91/49 |
| 4,437,386 | 3/1984 | Baumgartner | 91/363 R |
| 4,441,735 | 4/1984 | Hutchison | 280/771 |
| 4,487,281 | 12/1984 | Cordiano | 180/428 |
| 4,515,066 | 5/1985 | Ito et al. | 91/454 |
| 4,622,859 | 11/1986 | Hobson | 74/15.88 |
| 4,669,361 | 6/1987 | Ito et al. | 91/459 |
| 4,695,068 | 9/1987 | Kawamoto | 180/409 |
| 4,756,234 | 7/1988 | Anderson | 91/454 |
| 4,799,418 | 1/1989 | Takahashi et al. | 91/449 |
| 4,831,915 | 5/1989 | Roach | 92/49 |
| 5,113,641 | 5/1992 | Cook et al. | 56/10.5 |
| 5,174,595 | 12/1992 | Snipes | 180/411 |
| 5,321,910 | 6/1994 | Legendre et al. | 49/324 |
| 5,321,938 | 6/1994 | LeBlanc | 56/6 |
| 5,415,012 | 5/1995 | Maier-Laxhuber | 62/269 |
| 5,477,642 | 12/1995 | Legendre | 49/340 |
| 5,529,135 | 6/1996 | Wenzel et al. | 180/6.24 |
| 5,636,444 | 6/1997 | Nickel | 30/276 |
| 5,651,422 | 7/1997 | Casali | 180/13 |
| 5,788,276 | 8/1998 | Yamanaka | 280/771 |

FOREIGN PATENT DOCUMENTS 59-145631  8/1984  Japan .............................. B60K 25/02

OTHER PUBLICATIONS

The International Search Report PCT/US98/12303 Mailed Sep. 23, 1998.

*Primary Examiner*—Kevin Hurley
*Assistant Examiner*—Andrew J. Ririe
*Attorney, Agent, or Firm*—Emerson & Associates; Roger D. Emerson; Timothy D. Bennett

[57] ABSTRACT

A power assisted, vacuum actuated steering system with a rotary valve and vacuum actuators. The rotary valve has two identical discs which each include grooves and channels for communicating the vacuum pressure to the vacuum actuators. The relative rotary motion of the two discs causes the vacuum pressure to pass to the vacuum actuators to assist the steering of a vehicle. A set of springs and spring arms biases the discs to a central, neutral position.

9 Claims, 13 Drawing Sheets

VACUUM ACTUATED POWER STEERING SYSTEM

The applicant for this non-provisional Continuation-In-Part patent application hereby claims priority based on the prior non-provisional patent application titled POWER ASSIST STEERING SYSTEM filed on Sep. 24, 1997 and given the Ser. No. 08/936,372 that itself claims priority based on the prior provisional patent application titled VACUUM ACTUATOR CONTROL MECHANISM, filed on Jul. 25, 1997 and given the Ser. No. 60/053,723.

BACKGROUND OF THE INVENTION

1. Field of Invention

This invention pertains to the art of methods and apparatuses for steering vehicles, and more specifically to methods and apparatuses for using a vacuum actuator to power assist the steering mechanism of a vehicle.

2. Description of the Related Art

It is well known to provide steering mechanisms for steering a vehicle. Typically, a steering mechanism uses a steering implement (such as a steering wheel) that adjusts a series of mechanical linkages so that the wheels of the vehicle can be turned. Such a steering mechanism can be difficult for the operator to operate due to the forces required to move the various mechanical linkages. To overcome this problem, it is known in the art to provide power steering systems which diminish the effort required by the operator in steering the vehicle. However, such power steering systems typically include hydraulic systems or other similarly complex systems. Therefore, power steering systems known in the art, though effective, are difficult to construct, add considerable weight to the vehicle and are expensive.

The present invention provides methods and apparatuses for a power assist steering system that utilizes a vacuum actuator and can be used to assist the steering mechanism of a vehicle. The difficulties inherit in the art are therefore overcome in a way that is simple and efficient while providing better and more advantageous results.

SUMMARY OF THE INVENTION

According to one aspect of the present invention, there is provided a power assist steering system for use on a vehicle. The power assist steering system includes a first vacuum actuator, vacuum means for providing a vacuum to the first vacuum actuator, activating means for selectively activating the first vacuum actuator and power assist means for assisting a steering mechanism on the vehicle.

According to another aspect of the present invention, the power assist steering system also includes a second vacuum actuator. The first vacuum actuator is used with the power assist means to turn the wheels of the vehicle in a first direction while the second vacuum actuator is used with the power assist means in turning the wheels of the vehicle in a second direction.

According to another aspect of the present invention, the activating means includes first and second discs that can be moved relative to one another and that provide for variable activation of the vacuum actuators. Biasing means is provided to bias the discs into a neutral or fully closed condition.

According to another aspect of the present invention, there is provided a method for steering a vehicle. The method includes the steps of adjusting a steering implement, switching a switching means, initiating a first vacuum actuator and turning the wheels.

According to another aspect of the present invention, another method for steering a vehicle is provided. The method includes the steps of adjusting a steering implement, rotating a first disc with respect to a second disc, initiating a first vacuum actuator and turning the first wheel.

One advantage of the present invention is that it is easy to manufacture and can be made economically.

Another advantage of the present invention is that it is formed of components that are light in weight.

Another advantage of the present invention is that an intake manifold, typically used in internal combustion engines, can be used as a vacuum source.

Another advantage of the invention is that a vehicle can be assisted in its steering without the need for a hydraulic system or other such complex steering system.

Another advantage of the invention is that the degree of turn or force that the operator inputs to the steering implement directly varies or controls the amount of power assist that the steering system receives from the power assist steering system.

Still other benefits and advantages of the invention will become apparent to those skilled in the art to which it pertains upon a reading and understanding of the following detailed specification.

BRIEF DESCRIPTION OF THE DRAWINGS

The invention may take physical form in certain parts and arrangement of parts, a preferred embodiment of which will be described in detail in this specification and illustrated in the accompanying drawings which form a part hereof and wherein.

DESCRIPTION OF THE PREFERRED EMBODIMENT

Figure 1:
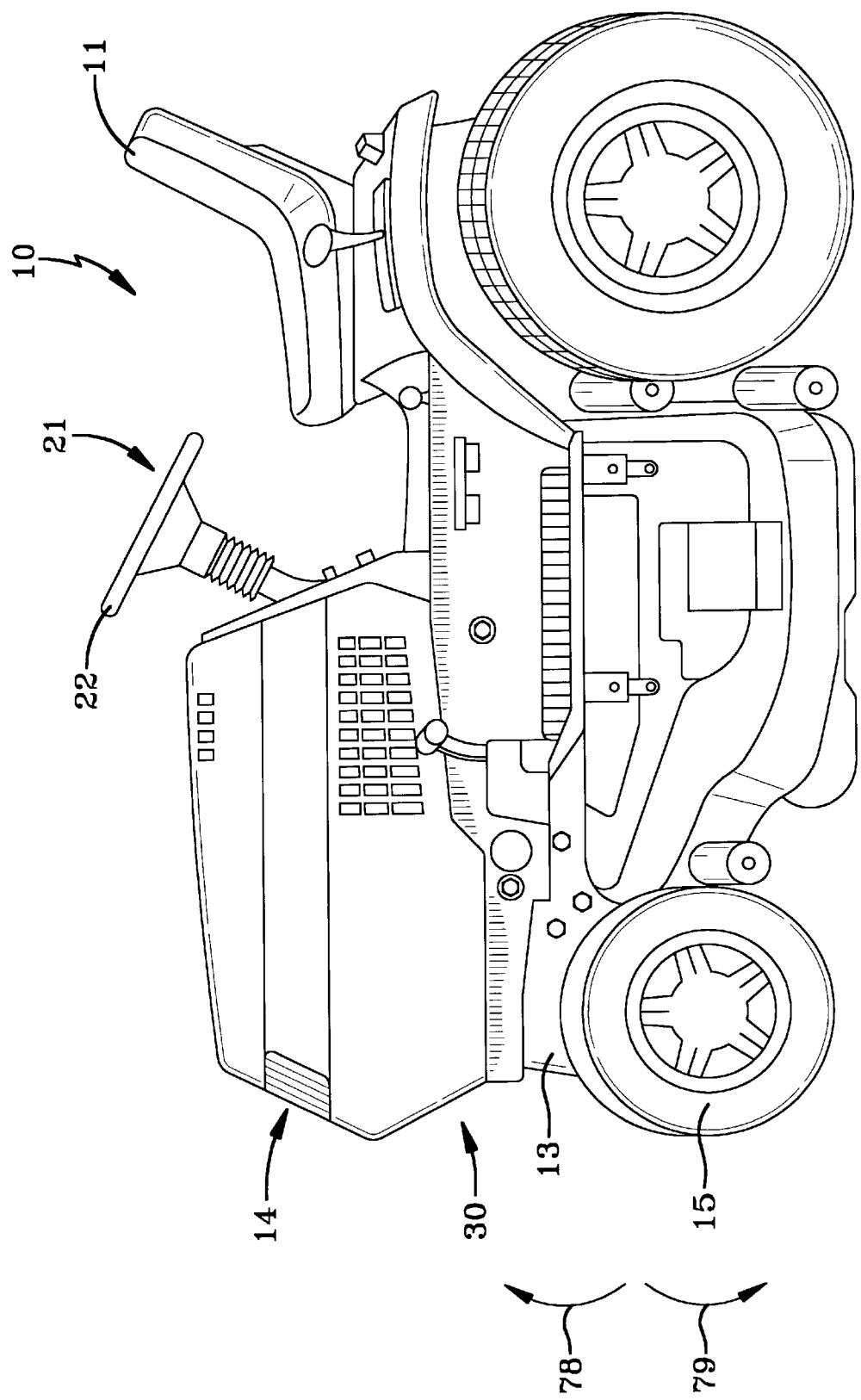
FIG. 1 is a perspective side view of a typical riding lawn mower that is equipped with the power assist steering system of the present invention.
Figure 2:
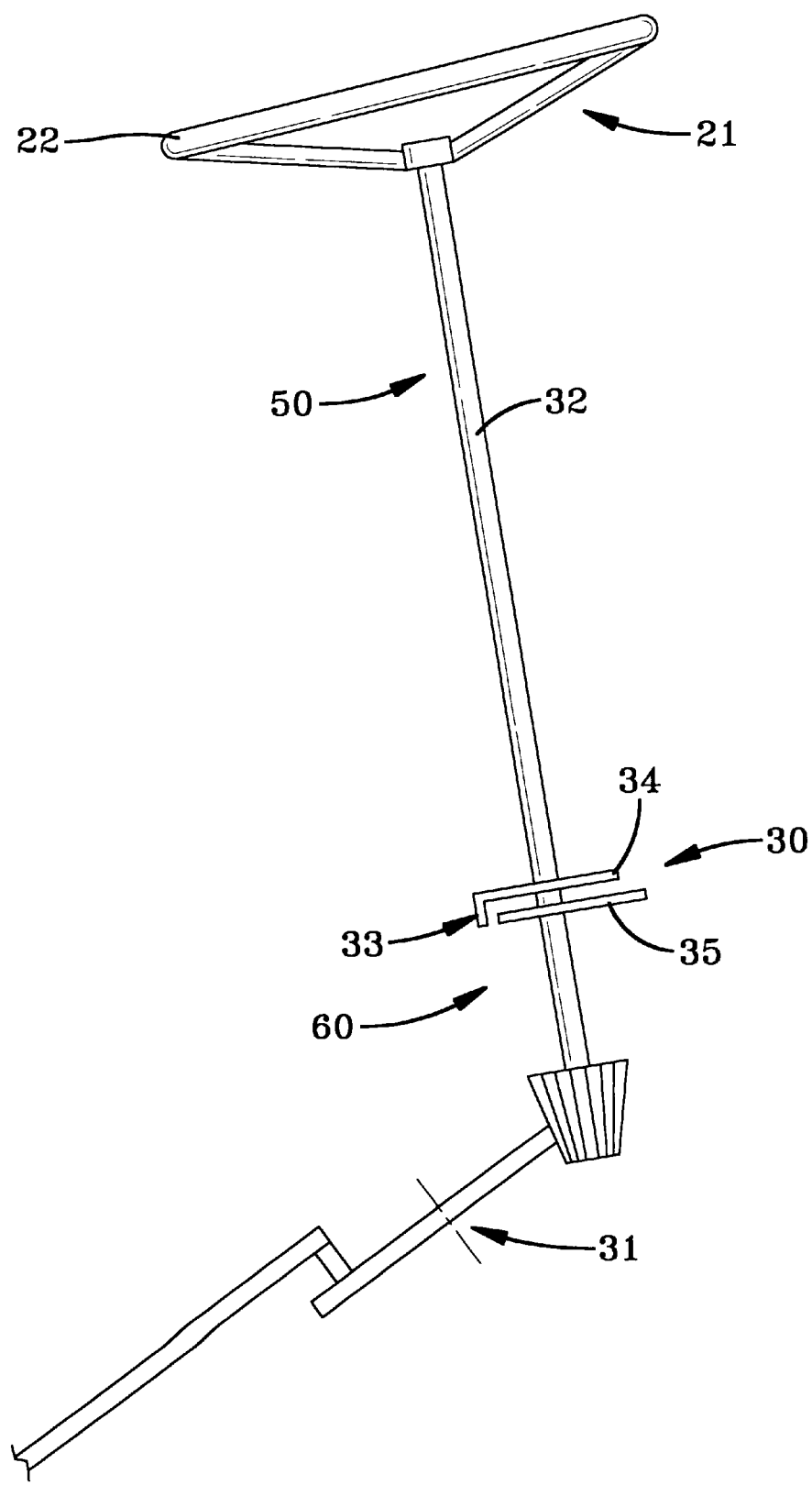
FIG. 2 is a schematic side view showing the power assist steering system as it operatively connects a steering implement to a steering mechanism.

Referring now to the drawings wherein the showings are for purposes of illustrating a preferred embodiment of the invention only and not for purposes of limiting the same, FIG. 1 shows a riding mower 10 which is equipped with a power assist steering system 30 in accordance with this invention. This preferred embodiment is directed to a riding lawn mower but the invention is applicable to other vehicles, and other applications as well. The riding mower 10 includes an operator seat 11, a frame 13, a steering implement 21 used to turn first and second wheels 15, 16 (the second wheel 16 can be seen in FIGS. 3 and 4) and an engine 14. The engine 14 can be of any type currently used in the art but preferably it includes a vacuum means 24 such as an intake manifold 25 as shown in FIG. 4. It should be noted that other vacuum means can also be used for this invention.

Referring now FIGS. 1–4, the power assist steering system 30 of this invention includes first and second vacuum actuators 40, 41, the vacuum means 24 for providing a vacuum to the first and second vacuum actuators 40, 41, activating means 50 for selectively activating the first and second vacuum actuators 40, 41, and power assist means 60 for use in turning the first and second wheels 15, 16.

With reference now to FIGS. 3 and 5–8, any vacuum actuator chosen with sound engineering judgement is useful for this invention. The preferred vacuum actuator 40 has a connection port 47 for operative connection to the vacuum means 24 shown in FIG. 4. In the preferred embodiment, the connection port 47 is connected to a first vacuum line 45. The first vacuum actuator 40 also has a first side 48 that moves in inward direction 82 as a vacuum is established inside the first vacuum actuator 40. When a vacuum within the first vacuum actuator 40 is removed, the first side 48 moves in outward direction 83. Outward direction 83 is shown as first direction 17 in FIG. 3 and inward direction 82 is shown as second direction 18 in FIG. 3. Therefore the first vacuum actuator 40 can be initiated by either establishing a vacuum within or removing a vacuum from the first vacuum actuator 40. The first side 48 of the first vacuum actuator 40 will move accordingly. Such movement of the first side 48 of the first vacuum actuator 40 can be used with the power assist means 60 as will be discussed further below. It should be understood that the second vacuum actuator 41 having a first side 49 is similarly constructed and operated.

Figure 8:
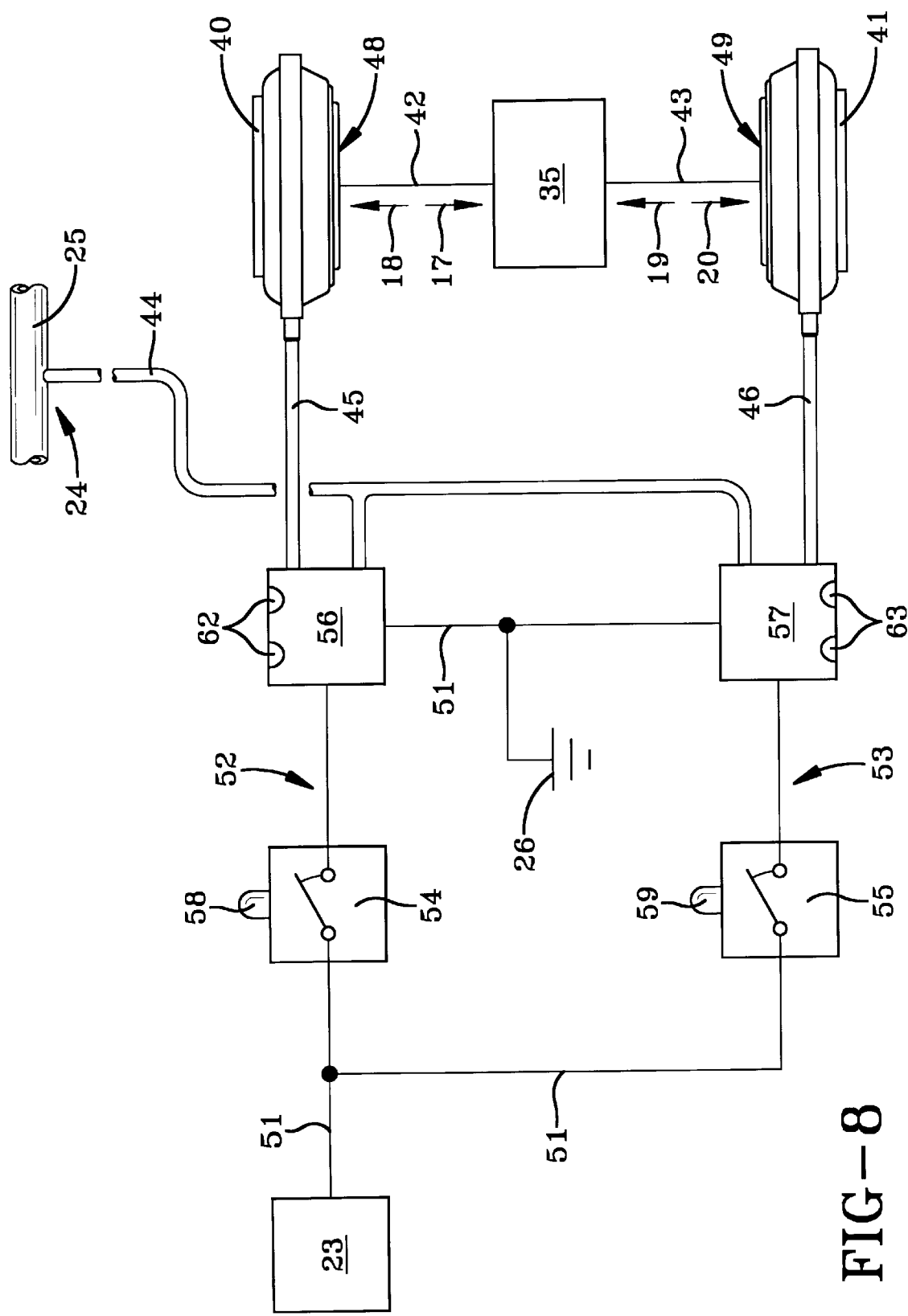
FIG. 8 is a schematic representation using an alternate switching means and showing how first and second electric switches are used to activate first and second solenoid valves thereby initiating the first and second vacuum actuators.

With reference now to FIGS. 1, 4 and 8, in the preferred embodiment the engine 14 of the riding mower 10 has an intake manifold 25 as is commonly known in the art. The intake manifold 25 is preferably used as the vacuum means 24 for providing a vacuum to the first and second vacuum actuators 40,41. In this way, as long as the engine 14 of the riding mower 10 is running, there is a vacuum means 24 available for the power assist steering system 30. It should be noted that other vacuum means, such as a vacuum pump (not shown), can be used with this invention. A vacuum source line 44 communicates the intake manifold 25 to a first and second switching means 52, 53 that will be discussed further below.

With reference now to FIGS. 1–4, the power assist steering system 30 of this invention receives operator input from the steering implement 21 and transmits that input through a steering mechanism 31 to the first and second wheels 15, 16. In this embodiment the steering implement 21 is a steering wheel 22. This invention is also operable with other types of steering implements 21 such as the use of levers (not shown). The steering mechanism 31 can be of any type currently known in the art. The steering wheel 22 of this embodiment is operatively connected to a steering rod 32 for operative connection to the power assist steering system 30.

With continuing reference to FIGS. 1–4, the activating means 50 used to selectively activate the first and second vacuum actuators 40, 41 can also be of any type chosen with sound engineering judgement. In this preferred embodiment the activating means 50 includes the first and second switching means 52, 53 which are used to initiate the first and second vacuum actuators 40,41. The activating means 50 also includes the vacuum source line 44 that communicates a vacuum from the intake manifold 25 to the first and second switching means 52, 53. The first vacuum line 45 communicates the first switching means 52 to the first vacuum actuator 40 and a second vacuum line 46 communicates the second switching means 53 to the second vacuum actuator 41. The activating means 50 also includes a trigger segment 34 that is fixedly connected to the steering rod 32 whereby it can be selectively rotated by the steering implement 21. The trigger segment 34 has an extension 33 fixedly attached thereon. Preferably the extension 33 extends transversely across the trigger segment 34 and has first and second ends 65, 66. The extension 33 of the trigger segment 34 is used in switching the first and second switching means 52, 53 as will be discussed further below.

With reference now to FIGS. 4 and 8, the first and second switching means 52, 53 can be of any type chosen with sound engineering judgement. Two alternative embodiments of the first and second switching means 52, 53 are herein disclosed. The first and second switching means 52, 53 shown in FIG. 4, include first and second air valve 38, 39 having tips 27, 28 and holes 84, 85 that permit ambient air to enter the system when the first and second air valves 38, 39 are closed. When the tips 27, 28 are pressed by the extension 33 of the trigger segment 34, the first and second air valves 38, 39 can thus be opened and closed.

Alternately, with reference now to FIG. 8, the first and second switching means 52, 53 of this embodiment includes first and second electric switches 54, 55 having tips 58, 59 and first and second solenoid valves 56, 57. The first and second electric switches 54, 55 are positioned near the first and second ends 65, 66 of the extension 33 as were the first and second air valves 40, 41 shown in FIG. 4. The first and second solenoid valves 56, 57, as is commonly known in the art, activate, i.e., open and close, in response to an electric signal. The first and second solenoid valves 56, 57 have holes 62, 63 that permit ambient air to enter the system when the first and second solenoid valves 56, 57 are closed. This embodiment includes a power source 23 that is preferably operatively associated with the engine 14 of the riding mower 10, shown in FIG. 1. The first and second electric switches 54, 55, the first and second solenoid valves 56, 57 and a ground 26 are connected electrically by wiring 51, as shown in FIG. 8. When the tip 58 of the first electric switch 54 is pressed by the first end 65 of the extension 33, the first electric switch 54 can be opened and closed. When the first electric switch 54 is closed, an electric signal proceeds from the power source 23 through the first electric switch 54 and to the first solenoid valve 56. This activates the first solenoid valve 56. The second electric switch 55 and the second solenoid valve 57 are similarly operated when the second end 66 of the extension 33 presses the tip 59. In this way, the second solenoid valve 57 is activated.

With reference now to FIGS. 1–4, the power assist means 60 for assisting the steering mechanism 31 in turning the first and second wheels 15, 16 will now be further disclosed. The power assist means 60 includes a valve plate 35 that is used to support the first and second switching means 52, 53. Attached to a first side 68 of the valve plate 35 is a first stop bar 36. Similarly, attached to a second side 69 of the valve plate 35 is a second stop bar 37. The first and second stop bars 36, 37 are used to engage the first and second ends 65, 66 of the extension 33 for two reasons. First, the first and second stop bars 36, 37 prevent the extensions 33 from moving toward the first and second switching means 52, 53 beyond what is necessary to switch the first and second switching means 52, 53. This protects the first and second switching means 52, 53. Second, the first and second stop bars 36, 37, when contacted by the first and second ends 65, 66 of the extension 33, transmit the operator input from the trigger segment 34 to the valve plate 35. Thus, if the power assist steering system 30 was inoperative for any reason, such as if the vacuum means 24 was stopped due to the engine 14 shutting off, the riding mower 10 could still be turned though it would require additional effort from the operator.

Figure 3:
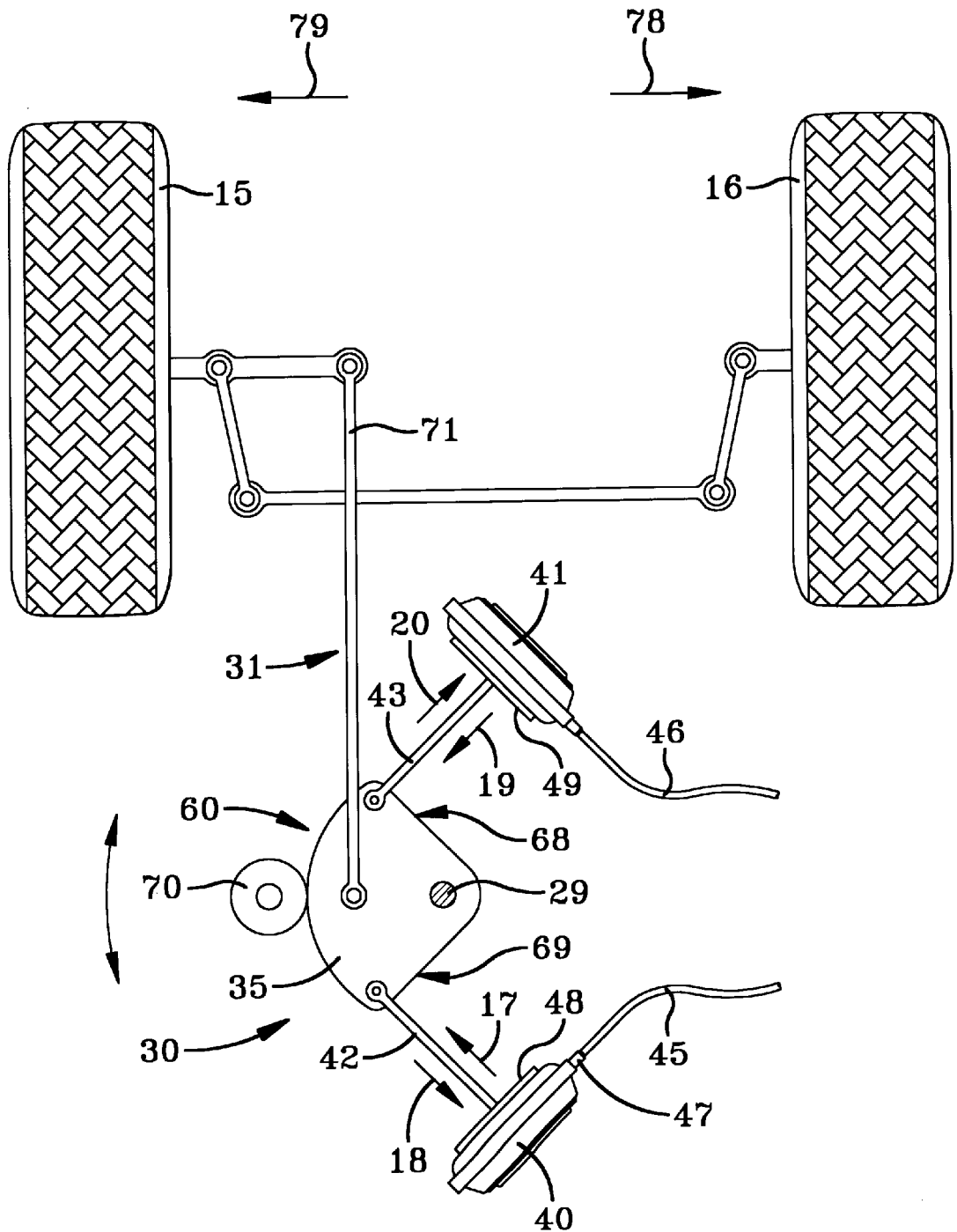
FIG. 3 is a schematic representation showing how the first and second vacuum actuators are operatively connected to the steering mechanism of a vehicle.
Figure 4:
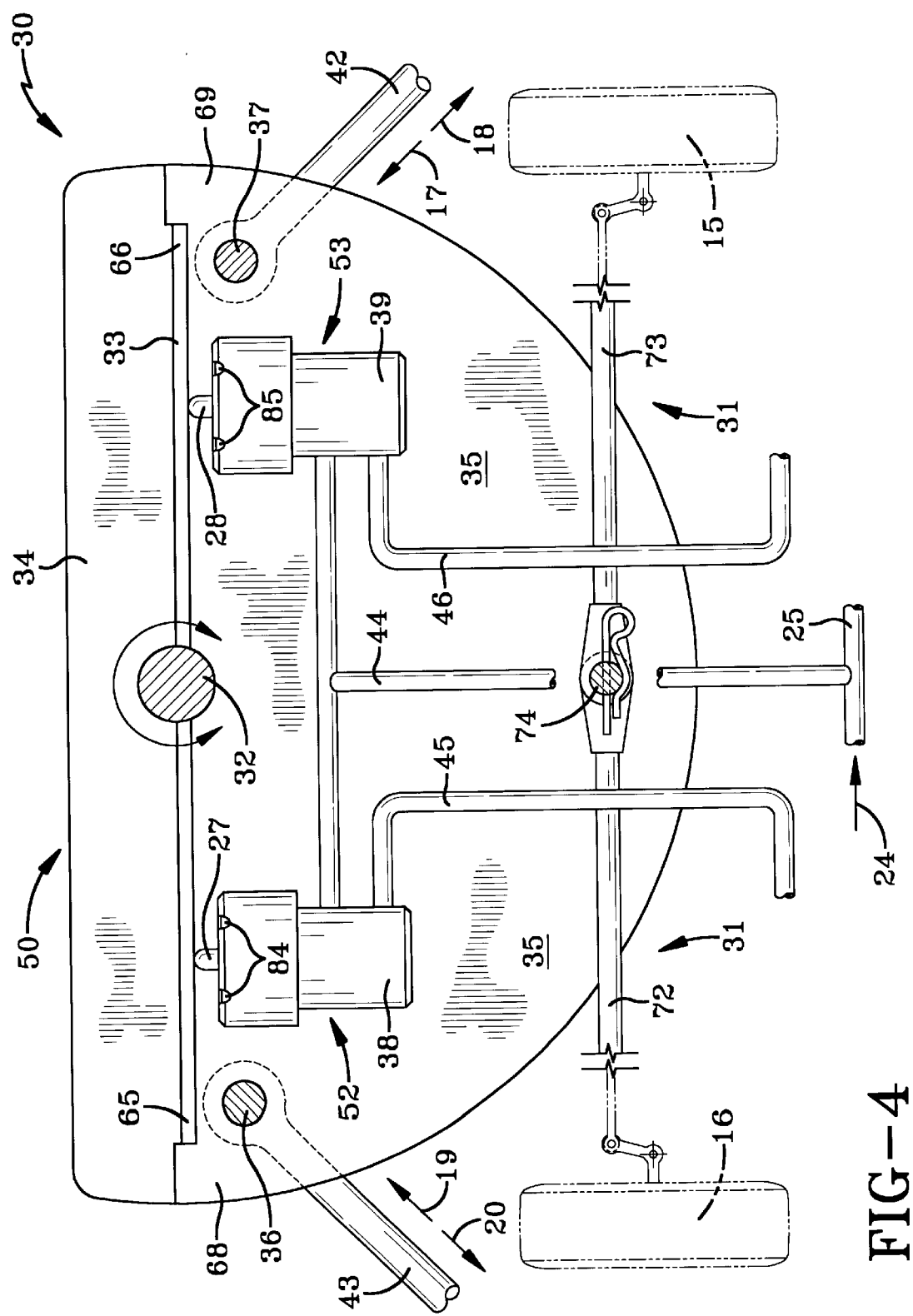
FIG. 4 is a schematic bottom view showing how the extension of the trigger segment is used to switch the first and second switching means.
Figure 5:
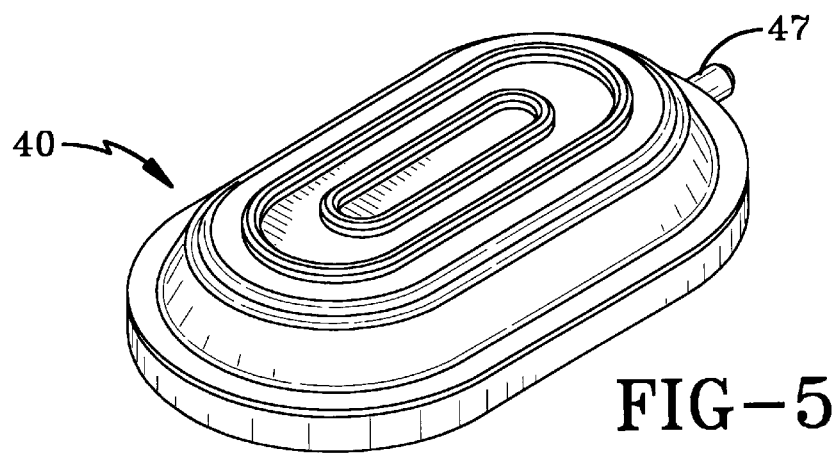
FIG. 5 is a perspective top view of the preferred vacuum actuator of the present invention.
Figure 6:
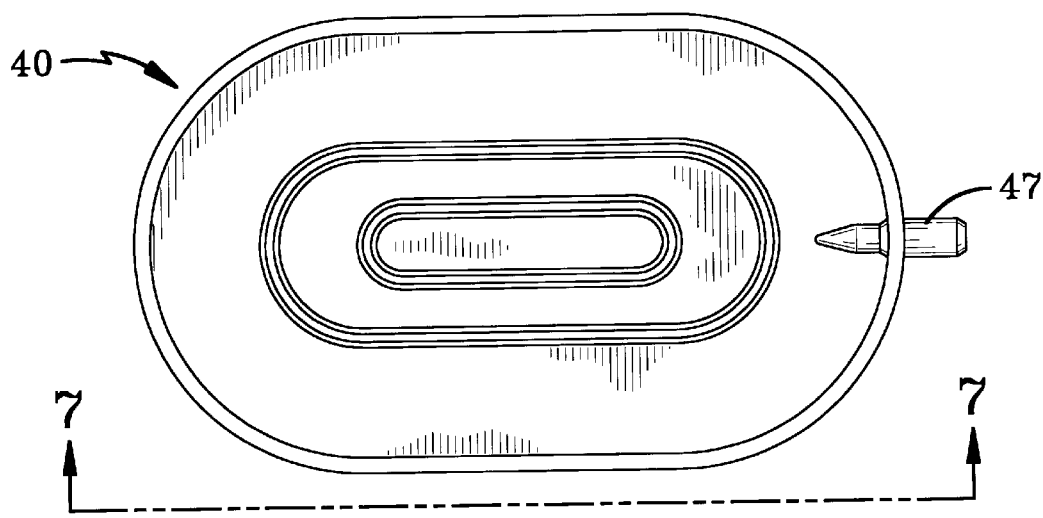
FIG. 6 is a top view of the vacuum actuator of FIG. 5 taken along the line 6—6 of FIG. 7 showing the connection port.

With continuing reference to FIGS. 1–4, the power assist means 60 also includes a first connector link 42 that is pivotably connected to the first side 48 of the first vacuum actuator 40 and to the second side 69 of the valve plate 35. Similarly, a second connector link 43 is operatively connected to the first side 49 of the second vacuum actuator 41 and to the first side 68 of the valve plate 35. It should be noted that the particular means for transmitting the motion of the valve plate 35 to the steering mechanism 31, can be of any type chosen with sound engineering judgement. Two embodiments are disclosed herein. In FIG. 3, the steering mechanism 31 includes a steering gear 70 that is operatively connected to the valve plate 35 and a first linkage 71 that is operatively connected to the first and second wheels 15, 16. When the first side 48 of the first vacuum actuator 40 (and therefore the first connector link 42) is forced in first direction 17, the valve plate 35 pivots about a pivot point 29 in a clockwise direction as seen in FIG. 3 and simultaneously rotates the steering gear 70 in a counterclockwise direction as seen in FIG. 3. This motion forces the first linkage 71 to transmit a first turning force to the first and second wheels 15, 16 in a manner currently known in the art. When the first side 49 of the second vacuum actuator 41 (and therefore the second connector link 43) is forced in a first direction 19, the valve plate 35 pivots about the pivot point 29 in a counterclockwise direction as seen in FIG. 3 and simultaneously rotates the steering gear 70 in a clockwise direction as seen in FIG. 3. This motion forces the first linkage 71 to transmit a second turning force to the first and second wheels 15, 16 in a manner currently known in the art.

With reference now to FIG. 4, the steering mechanism 31 of this embodiment includes a first member 72 that is operatively connected to the second wheel 16 and a second member 73 that is operatively connected to the first wheel 15. Both the first and second members 72, 73 are pivotably connected to the valve plate 35 by means of a pivot shaft 74. When the first connector link 42 is forced in first direction 17, the valve plate 35 pivots about the steering rod 32 in a counterclockwise direction as shown in FIG. 4. This forces the second member 73 to move toward the first wheel 15 thereby transmitting a first turning force to the first and second wheels 15, 16 in a manner currently known in the art. Similarly, when the second connector link 43 is forced in first direction 19, the valve plate 35 pivots about the steering rod 32 in a clockwise direction as shown in FIG. 4. This motion forces the first member 72 to move toward the second wheel 16 and therefore to transmit a second turning force to first and second wheels 15, 16 in a manner currently known in the art.

Figure 7:
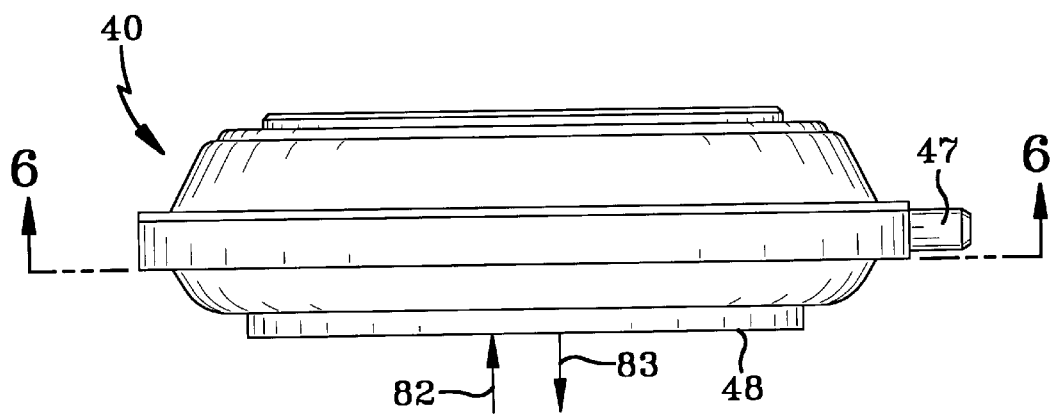
FIG. 7 is a side view of the vacuum actuator of FIG. 5 taken along the line 7—7 of FIG. 6 showing that a first side can be moved.

With continuing reference FIGS. 1–4, the operation of the power assist steering system 30 will first be described when the first and second switching means 52, 53 includes the first and second air valves 38, 39. When the operator desires to turn the riding mower 10 in first direction 78 as seen in FIG. 3, he adjusts the steering implement 21 in a manner commonly known in the art. This motion causes the trigger segment 34 to rotate in a counter clockwise direction as seen in FIG. 4. The first end 65 of the extension 33 contacts and presses the tip 27 of the first air valve 38 thereby closing the first air valve 38. This cuts off the first vacuum actuator 40 from the vacuum means 24. When the first air valve 38 is closed, air is drawn through the holes 84 in the first air valve 38, on through the first vacuum line 45 and into the first vacuum actuator 40 thereby removing the vacuum from the first vacuum actuator 40. This forces the first side 48 of the first vacuum actuator 40 as well as the first connector link 42 to move in first direction 17. It should be noted that this first direction 17 corresponds to outward direction 83 as shown in FIG. 7. This motion of the first connector link 42 forces the valve plate 35 to also rotate in a counterclockwise direction as seen in FIG. 4. The rotation of the valve plate 35 is then transmitted to the steering mechanism 31 and then to the first and second wheels 15, 16 as described above.

With continuing reference to FIGS. 1–4, should the operator then desire to turn the riding mower 10 in the second direction 79 as shown in FIG. 3 the steering implement 21 would be adjusted in a manner commonly known in the art thereby forcing the trigger segment 34 to rotate in a clockwise direction as seen in FIG. 4. Such a clockwise rotation of the trigger segment 34 would first cause the first end 65 of the extension 33 to move away from the tip 27 of the first air valve 38 thereby opening the first air valve 38. This re-communicates the first vacuum actuator 40 with the vacuum means 24 and re-establishes a vacuum within the first vacuum actuator 40. This forces the first side 48 of the first vacuum actuator 40 as well as the first connector link 42 to move in a second direction 18 that corresponds to inward direction 82 as shown in FIG. 7. The valve plate 35 would correspondingly begin to move in a clockwise direction as seen in FIG. 4. As the trigger segment 34 is forced further in a clockwise direction, as seen in FIG. 4, the second end 66 of the extension 33 contacts and presses the tip 28 of the second air valve 39 thereby closing the second air valve 39. This cuts off the second vacuum actuator 41 from the vacuum means 24. When the second air valve 39 is closed, air is drawn through the holes 85 in the second air valve 39, on through the second vacuum line 46 and into the second vacuum actuator 41 thereby removing the vacuum from the second vacuum actuator 41. This forces the first side 49 of the second vacuum actuator 41 as well as the second connector link 43 to move in first direction 19. This motion of the second connector link 43 forces the valve plate 35 to rotate in a clockwise direction as seen in FIG. 4. The rotation of the valve plate 35 is then transmitted to the steering mechanism 31 and then to the first and second wheels 15, 16 as described above.

With reference now to FIGS. 1–4 and 8, the operation of the power assist steering system 30 when the first and second switching means 52, 53 include the first and second electric switches 54, 55 is similar to that just described. When the first electric switch 54 is closed by the first end 65 of the extension 33, the first solenoid valve 56 is closed as described above. When the first solenoid valve 56 is closed ambient air is drawn through the holes 62 in the first solenoid valve 52, on through the first vacuum line 45 and into the first vacuum actuator 40 thereby removing the vacuum from the first vacuum actuator 40. This forces the first side 48 of the first vacuum actuator 40 as well as the first connector link 42 to move in first direction 17. The transmittal of this force to the first and second wheels 15, 16 is the same as describe above. When the second electric switch 55 is closed the second solenoid valve 57 is closed as described above. When the second solenoid valve 57 is closed ambient air is drawn through the holes 63 in the second solenoid valve 57 on through the second vacuum line 46 and into the second vacuum actuator 41 thereby removing the vacuum from the second vacuum actuator 41. This forces the second side 49 of the second vacuum actuator 41 as well as the second connector link 43 to move in first direction 19. The transmittal of this force onto the first and second wheels 15, 16 is similar to that described above.

Figure 9:
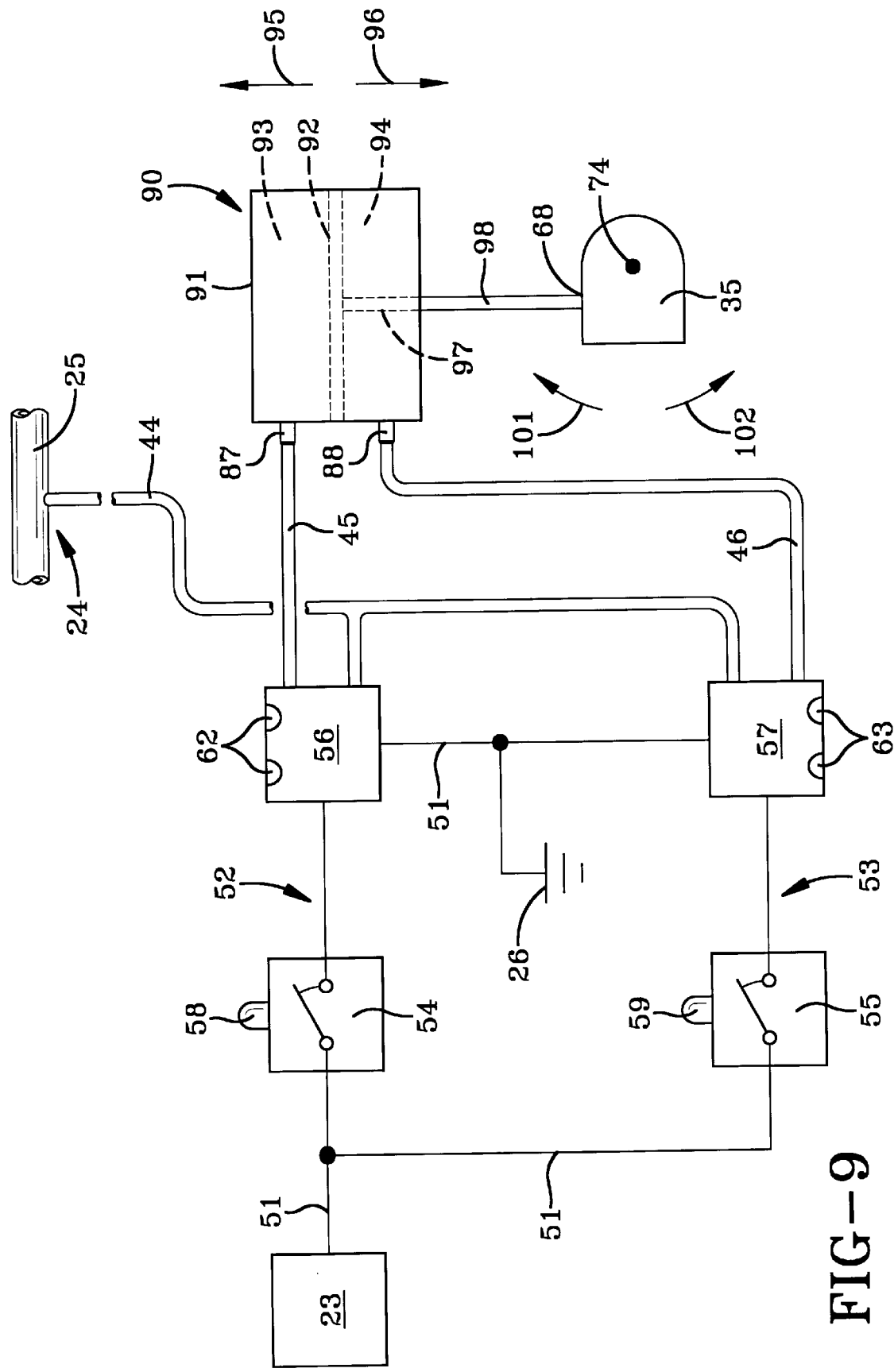
FIG. 9 is a schematic representation of another embodiment of the invention showing that a single double acting vacuum actuator may be used to replace the first and second vacuum actuators used in previous embodiments.

With reference now to FIG. 9, an alternate embodiment will now be disclosed. FIG. 9 illustrates that a single double acting vacuum actuator 90 can replace the first and second vacuum actuators (40 and 41 as shown in FIG. 8) used in the previous embodiments. The double acting vacuum actuator 90 has an actuator body 91 with a membrane 92 located therein. The membrane 92 is sealingly connected to the interior walls of the actuator body 91 yet can be selectively moved in either first or second directions 95, 96. By sealingly connected it is meant that air cannot pass through or around the membrane 92 within the actuator body 91 of the double acting vacuum actuator 90. The membrane 92 divides the double acting vacuum actuator 90 into first and second chambers 93, 94. First and second connection ports 87, 88 connect the first and second chambers 93, 94 to first and second vacuum lines 45, 46 respectively. Fixedly connected to the membrane 92 is an actuator rod 97 that extends external to the actuator body 91 of the double acting vacuum actuator 90 and is operatively connected to a connecting means 98. The connecting means 98 is pivotably connected to the first side 68 of the valve plate 35.

With reference to FIGS. 1, 4 and 9, the operation using the double acting vacuum actuator 90 is similar to that using two vacuum actuators. When the operator desires to turn the riding mower 10 in first direction 78 as seen in FIG. 1, the steering implement 21 is adjusted in a manner commonly known in the art. This motion causes the trigger segment 34 to rotate in a counter clockwise direction as seen in FIG. 4. The first end 65 of the extension 33 contacts and thereby switches the first switching means 52. It should be noted that the first switching means 52 can comprise either the first air valve 38 as shown in FIG. 4 or the first electric switch 54 as shown in FIG. 8. The switching of the first switching means 52 cuts off the first chamber 93 of the double acting vacuum actuator 90 from the vacuum means 24 in a manner described above. This forces the membrane 92 as well as the actuator rod 97 and the connecting means 98 to move in first direction 95. This motion of the membrane 92 thereby forces the valve plate 35 to rotate about the pivot shaft 74 in clockwise direction 101 as shown in FIG. 9. The rotation of the valve plate 35 is then transmitted to the steering mechanism 31 and then to the first and second wheels 15, 16 as described above.

With continuing reference to FIGS. 1, 4 and 9, should the operator desire to turn the riding mower 10 in second direction 79 as seen in FIG. 1, the steering implement 21 is adjusted in a manner commonly known in the art. This motion causes the trigger segment 34 to rotate in a clockwise direction as seen in FIG. 4. The second end 66 of the extension 33 contacts and thereby switches the second switching means 53. It should be noted that the second switching means 53 can comprise either the second air valve 39 as shown in FIG. 4 or the second electric switch 55 as shown in FIG. 8. The switching of the second switching means 53 cuts off the second chamber 94 of the double acting vacuum actuator 90 from the vacuum means 24 in a manner described above. This forces the membrane 92 as well as the actuator rod 97 and the connecting means 98 to move in second direction 96. This motion of the membrane 92 thereby forces the valve plate 35 to rotate about the pivot shaft 74 in counter clockwise direction 102 as shown in FIG. 9. The rotation of the valve plate 35 is then transmitted to the steering mechanism 31 and then to the first and second wheels 15, 16 as described above.

FIGS. 10–20 show another embodiment of this invention, a power assist steering system 100. The power assist steering system 100 is similar to the power assist steering system 30 discussed above in that it includes first and second vacuum actuators 40, 41 and vacuum means 24 such as the intake manifold 25 thereby providing a vacuum to the first and second vacuum actuators 40, 41. The power assist steering system 100 also includes activating means 110 for selectively activating the first and second vacuum actuators 40, 41 and power assist means 150 for use in turning the first wheel 15 shown in FIG. 1. It should be noted that the single double acting vacuum actuator 90 (shown in FIG. 9) can replace the first and second vacuum actuators 40, 41 for this embodiment just as in the previously described embodiment.

Still referring to FIGS. 10–20, what should be especially noted is that the activating means 110 of this embodiment variably activates the first and second vacuum actuators 40, 41 unlike the previously described activating means 50 which essentially was an on/off operation. By on/off it is meant that the first and second vacuum actuators 40, 41 were each either fully open to the vacuum means, fully opened to atmospheric air or were fully closed off to both the vacuum means and atmospheric air. The activating means 110 of this embodiment, however, permits the first and second vacuum actuators 40, 41 to be variably open to the vacuum means and atmospheric air. This will be discussed further below.

Figure 10:
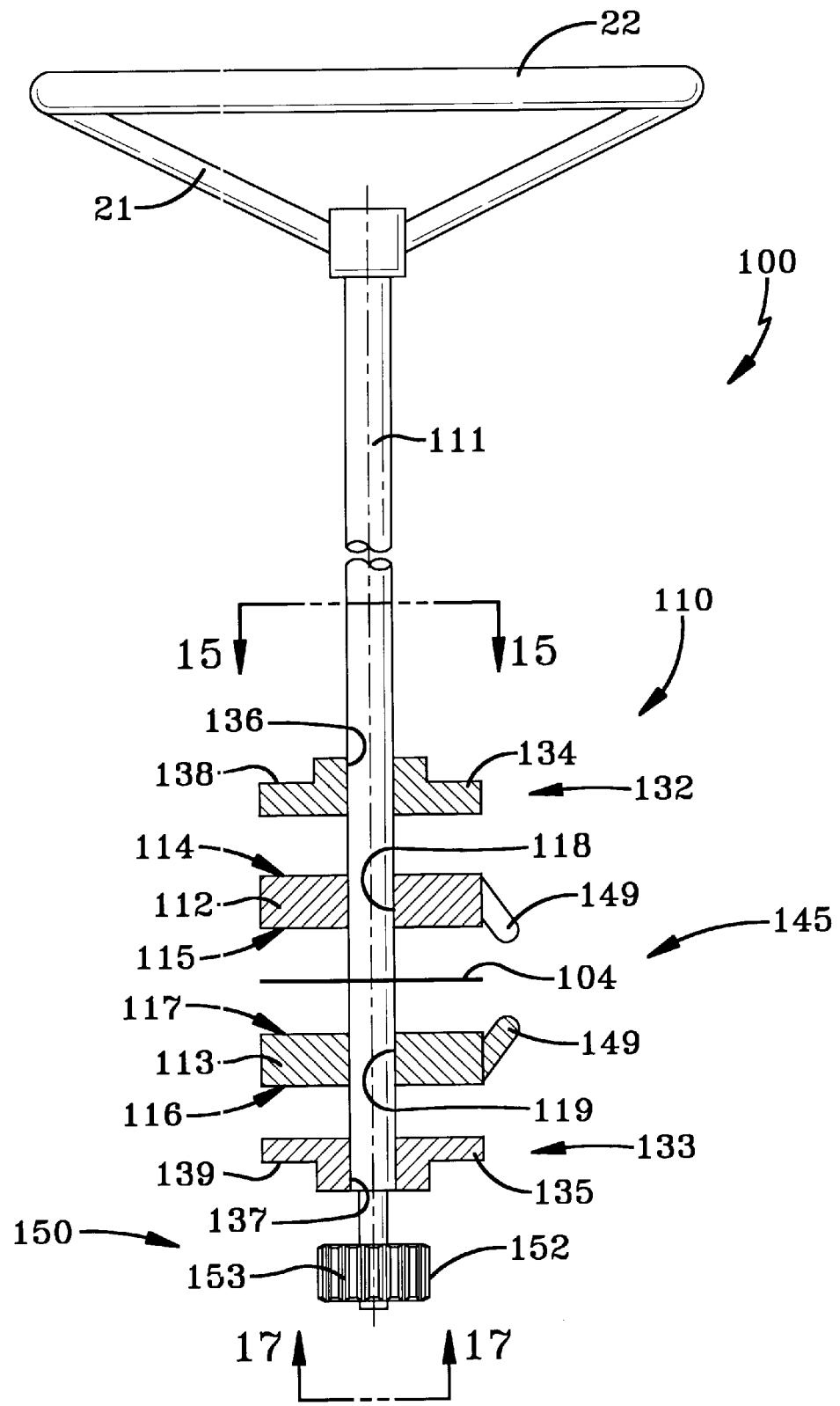
FIG. 10 is a sectional view of still another embodiment of the invention showing the first and second discs of the activating means separated for illustrative purposes.
Figure 11:
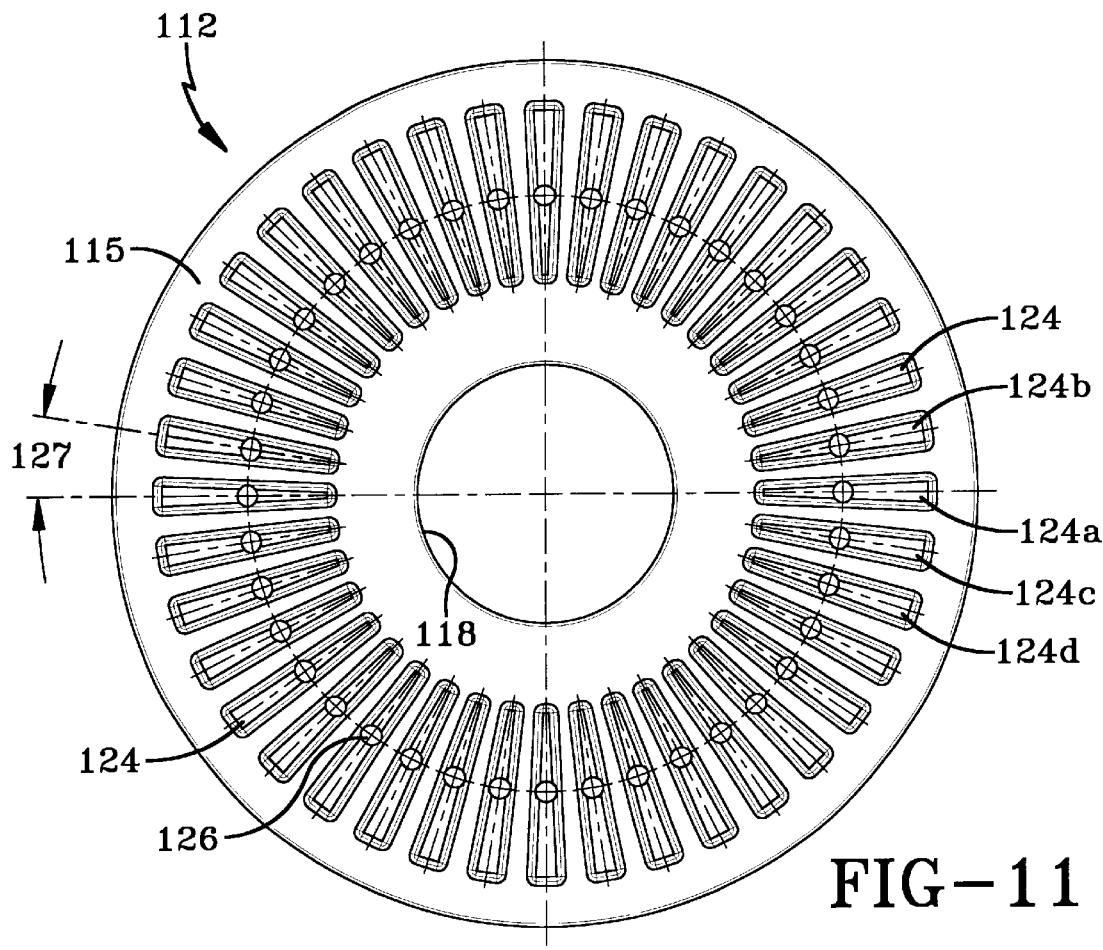
FIG. 11 is a bottom view of a disc showing the grooves in the second side surface.
Figure 12:
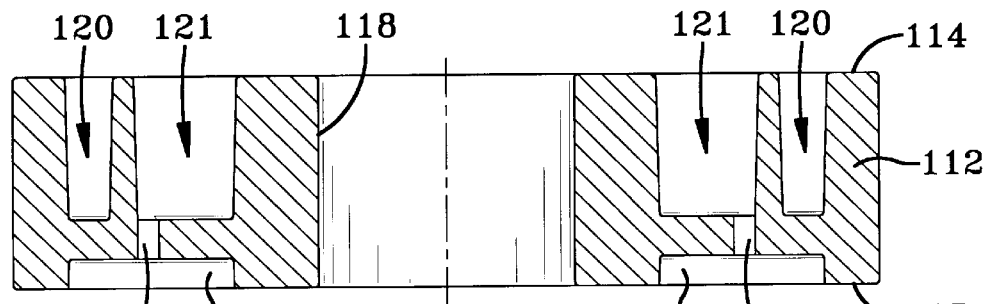
FIG. 12 is a sectional view of the disc taken along the line 12—12 of FIG. 14 showing the grooves in the second side surface communicating with the second channel in the first side surface.
Figure 13:
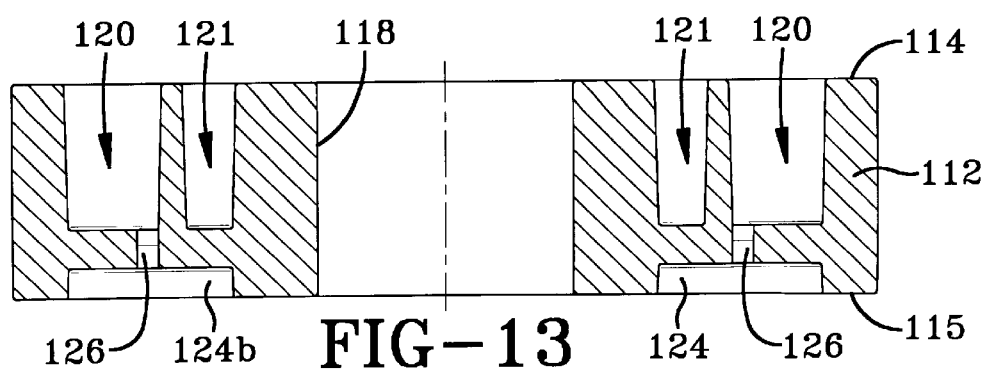
FIG. 13 is a sectional view of the disc taken along the line 13—13 of FIG. 14 showing the grooves in the second side surface communicating with the first channel in the first side surface.
Figure 14:
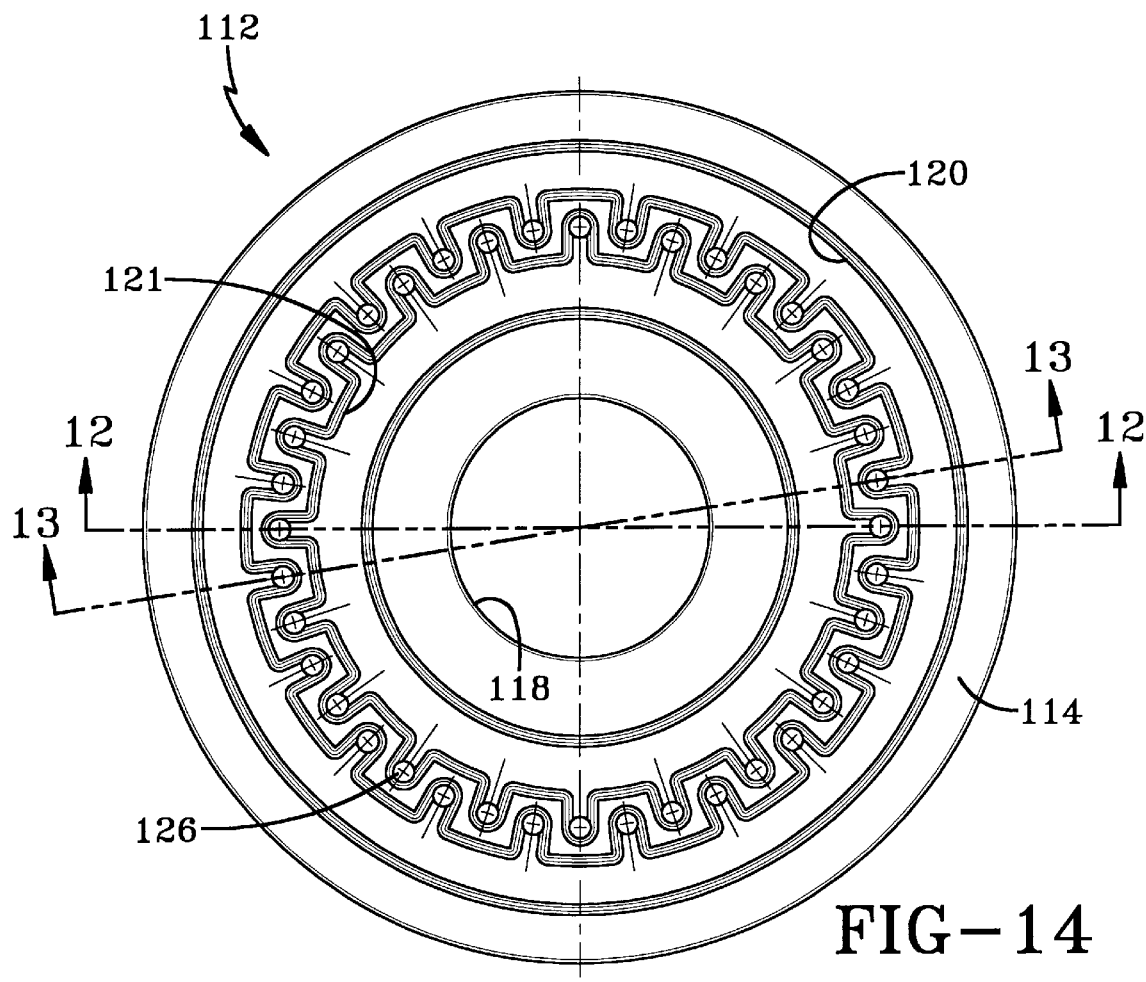
FIG. 14 is a plan view of the disc showing the first and second channels of the first side surface.

With reference now to FIGS. 10–13, the activating means 110 includes first and second discs 112, 113. The first disc 112 has a first side surface 114 with first and second channels 120, 121. The first and second channels 120, 121 can be of any shape and size chosen with sound engineering judgement but in the preferred embodiment they are annular as shown in the FIGURES. The second side surface 115 of the first disc 112 has a number of grooves 124. The grooves 124 can be sized and shaped in accordance with sound engineering judgement but in the preferred embodiment are annularly spaced as shown in FIG. 11. A number of apertures 126 connect the grooves 124 to the first and second channels 120, 121 in an alternating manner. By alternating manner it is meant that one groove 124 is connected by one aperture 126 to the first channel 120, while the neighboring groove 124 is connected by another aperture 126 to the second channel 121. Thus, for example, a first groove 124a is connected to the second channel 121 as shown in FIG. 12. A second groove 124b, on the other hand, is connected to the first channel 120 as shown in FIG. 13. Similarly, a third groove 124c communicates with the first channel 120 and a fourth groove 124d communicates with the second channel 121.

With reference to FIGS. 1 and 10–13, any number of grooves 124 and apertures 126, chosen with sound engineering judgement can be used in this invention. However, it should be noted that an even number of grooves and apertures 124, 126 is required. This is a requirement to maintain the alternating positioning of the grooves with respect to the first and second channels 120, 121. This will be discussed further below. As shown in FIG. 11, the grooves 124 are spaced apart by a groove angle 127. The groove angle 127 determines the relative movement of the first disc 112 with respect to the second disc 113 required to activate the activating means 110. In other words, the greater the groove angle 127 the greater the rotation of the steering rod 111 required to activate the activating means 110. For this reason it is preferred that the groove angle 127 be between 1° and 15°. A groove angle 127 of greater than 15° would certainly work but would be more difficult to operate since the steering rod 111 would require greater adjustment. For example, the steering wheel 22 (and thereby the steering rod 111) would have to be rotated more than 15° to fully activate the vacuum actuators. The groove angle 127 also cooperates with a later to be described play angle 157. It should also be noted that the second disc 113 is preferably identically sized and shaped as the first disc 112. Thus, the second disc 113 has a first side surface 116 with first and second channels 122, 123 as well as a second side surface 117 with grooves 125 and apertures 128. Apertures 128 connect the grooves 125 to the channels 122, 123 in an alternating manner as discussed above.

Figure 16:
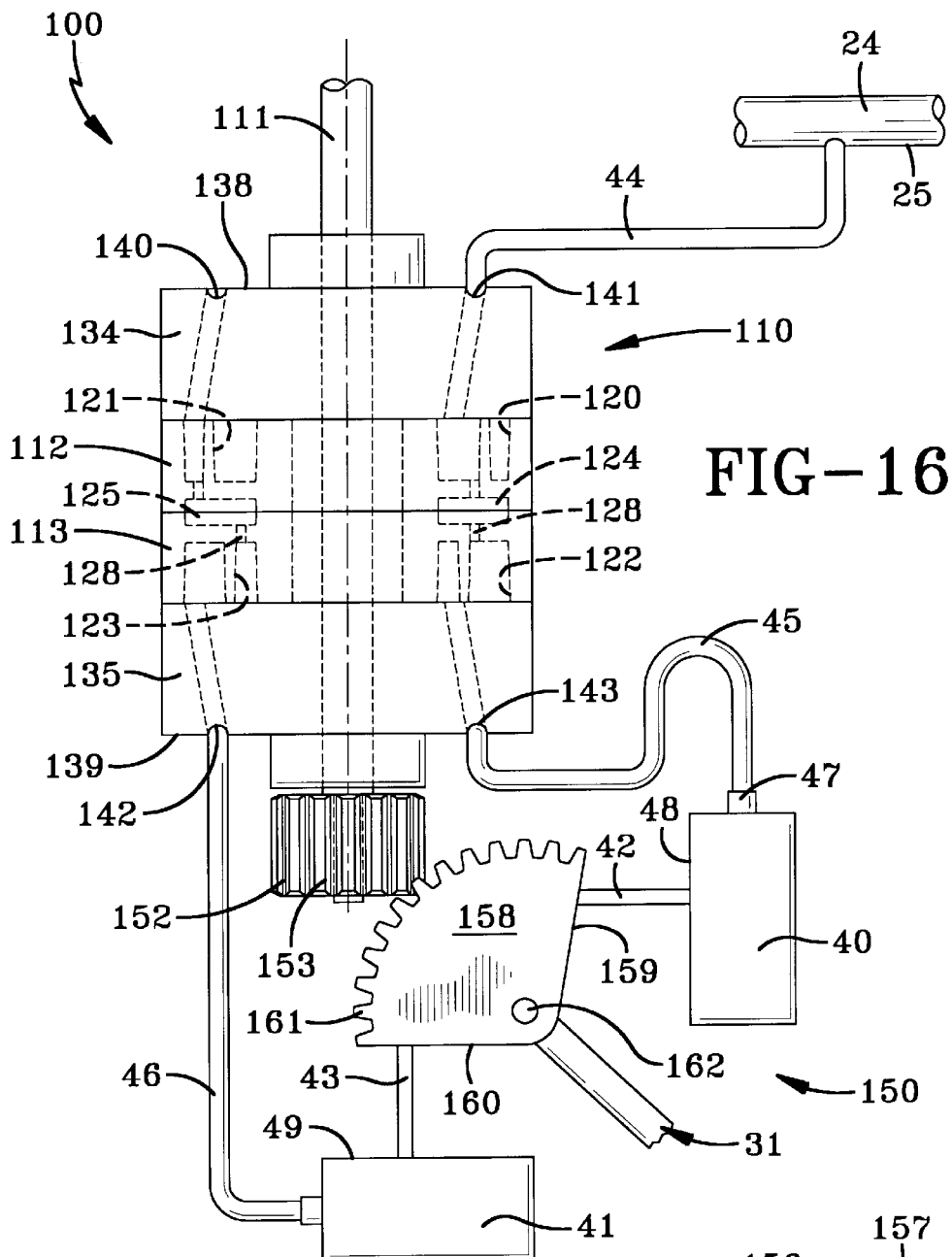
FIG. 16 is a schematic representation of the embodiment of FIG. 10 illustrating how the first and second discs are used to assist the steering of the vehicle.

With reference now to FIG. 10 and 16, the activating means 110 includes the steering rod 111 that is operatively connected to the steering implement 21 as well as the first and second discs 112, 113. The first and second discs 112, 113 have openings 118, 119 respectively for receiving the steering rod 111. First and second sealing means 132, 133 seal the first side surfaces 114, 116 of the first and second discs 112, 113. In the preferred embodiment, the first sealing means 132 comprises a first lid 134 having an opening 136 for receiving the steering rod 111. The second sealing means 133 similarly is preferred to be a second lid 135 having an opening 137 for receiving the steering rod 111. The lids 134, 135 are held to their respective discs 112, 113 by any holding means chosen with sound engineering judgement such as glue, bolts or screws, snap connectors, etc. It should be understood that though FIG. 10 shows the activating means 110 spaced apart, the various parts are actually in contact as shown in FIG. 16. Therefore, the second side surfaces 115, 117 of the first and second discs 112, 113 respectively are in operative contact. For this reason a disc sealing means 104 may be positioned between the first and second discs 112, 113. It is to be noted that this disc sealing means 104 is not required for this invention. However, in the preferred embodiment the disc sealing means 104 which can be of any type chosen with sound engineering judgement consists of a Teflon or silicone disc approximately 150 thousandths of an inch thick.

With continuing reference to FIGS. 10 and 16, the first side surfaces 114, 116 of the first and second discs 112, 113 require sealing means to prevent the channels 120, 121, 122, 123 from being opened to atmosphere. Therefore, in the preferred embodiment, the first lid 134 seals the first side surface 114. The first lid 134 has an outer surface 138 with first and second bores 140, 141. The first bore 140 communicates the outer surface 138 of the first lid 134 to the first channel 120 in the first disc 112. Similarly, the second bore 141 communicates the outer surface 138 to the second channel 121 in the first disc 112. The second lid 135 is similarly formed having an outer surface 139 with a first bore 142 communicating with the first channel 122 of the second disc 113 and a second bore 143 communicating with the second channel 123 of the second disc 113.

With reference now to FIGS. 9–10 and 16 it is to be understood that the relative position of the first disc 112 with respect to the second disc 113 determines the variability of air flow in the activating means 110 and thereby variably activates the vacuum actuators 140, 141 or the double acting vacuum actuator 90. As noted above and shown in FIG. 16, in normal operation the second side surface 115 of the first disc 112 faces the second side surface 117 of the second disc 113. Thus, the grooves 124 in the first disc 112 are juxtaposed with the grooves 125 in the second disc 113. Therefore, the first disc 112 can be positioned with respect to the second disc 113 such that the first bore 140 in the first lid 124 communicates with the first bore 142 in the second lid 135 while the second bore 141 in the first lid 134 communicates with the second bore 143 in the second lid 135. Alternately, the first disc 112 can be positioned with respect to the second disc 113 such that the first bore 140 in the first lid 134 communicates with the second bore 143 in the second lid 135 while the second bore 141 in the first lid 134 communicates with the first bore 142 in the second lid 135. This is the condition shown in FIG. 16. As the first disc 112 is rotated with respect to the second disc 113 the grooves 124 are moved with respect to the grooves 125.

Figure 19:
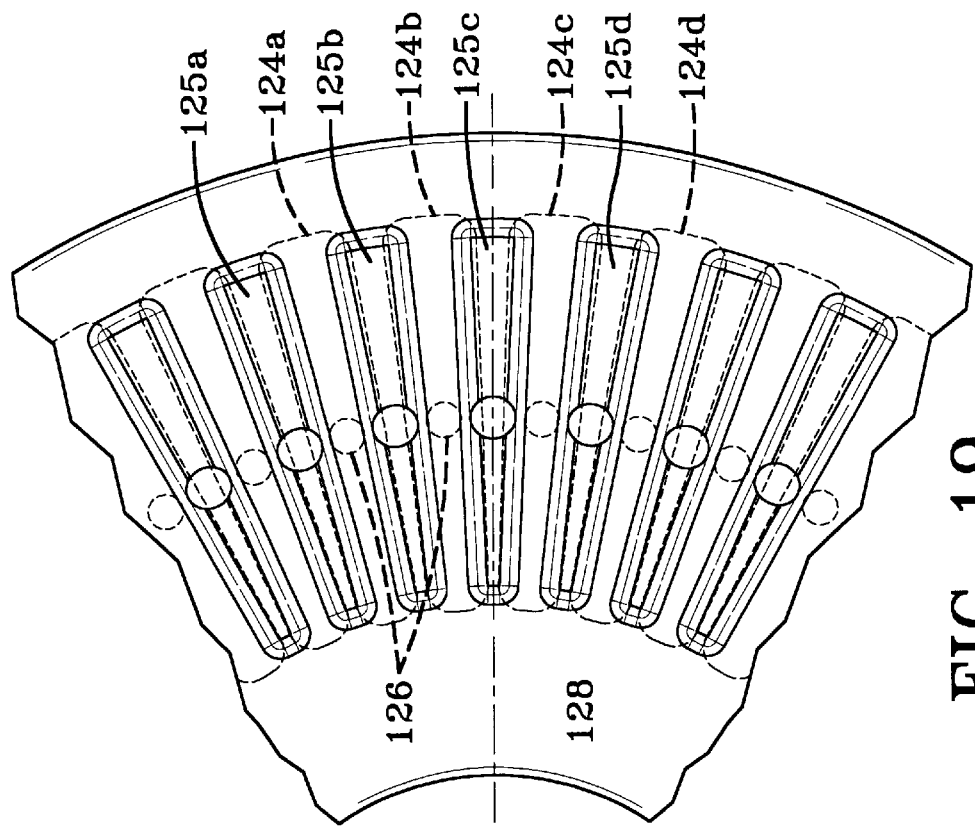
FIG. 19 is a cut away plan view showing the grooves in the first disc positioned between the grooves in the second disc.
Figure 18:
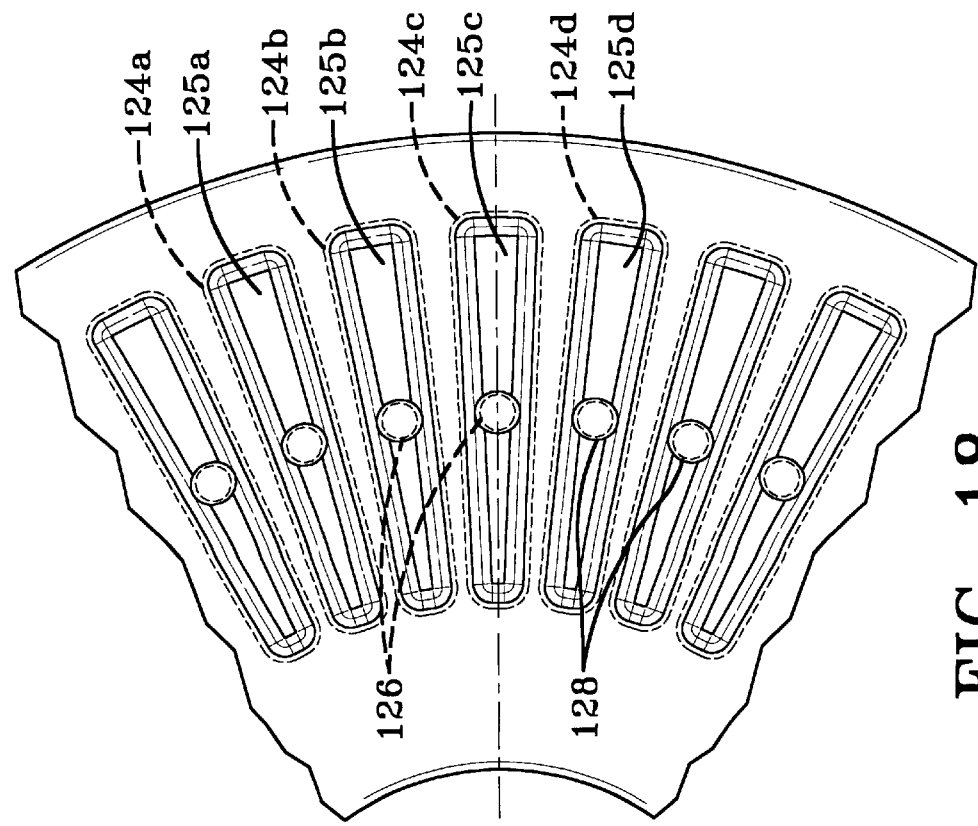
FIG. 18 is cut away plan view showing the grooves in the first disc overlaying the grooves in the second disc.
Figure 20:
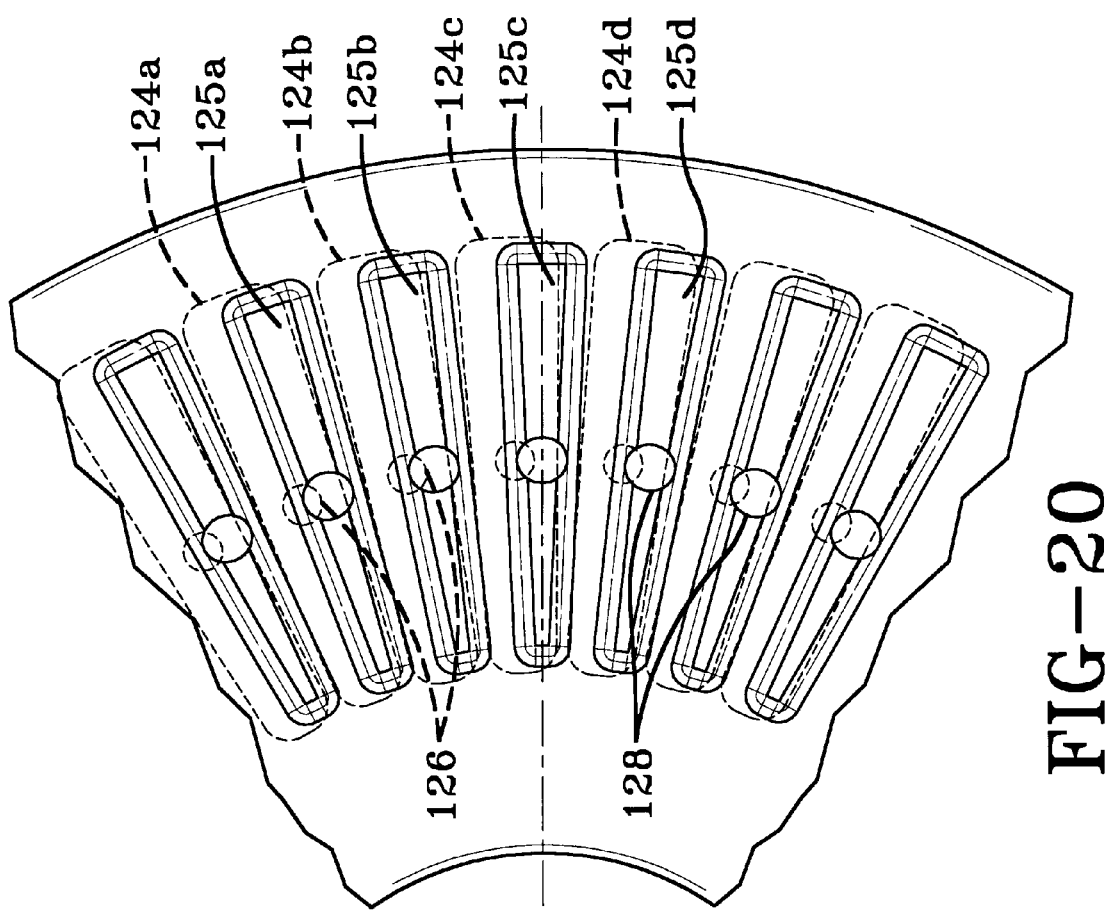
FIG. 20 is a cut away plan view showing the grooves in the first disc partially overlaying the grooves in the second disc.

FIGS. 18–20 show a plan view that illustrates how the grooves 124 in the first disc 112 are positioned with respect to the grooves 125 in the second disc 113 thereby providing the variability of air flow in the activating means 110. It should be noted that for sake of illustration the grooves 124 in the first disc 112 are shown as being larger than the grooves 125 in the second disc 113. Similarly, FIGS. 18–20 show the apertures 126 in the first groove 112 as being smaller than the apertures 128 in the second disc 113. Although the grooves 124, 125 and apertures 126, 128 can be sized in any way chosen with sound engineering judgement it is preferred that the grooves 124, 125 be of the same size and furthermore that the apertures 126, 128 be of the same size. FIG. 18 shows first, second, third and fourth grooves 124a, 124b, 124c, 124d in the first disc 112 overlaying first, second, third, and fourth grooves 125a, 125b, 125c, 126d in the second disc 113. In this relative position, the apertures 126 similarly overlay the apertures 128. Thus, it can be understood that this relative position provides the most direct airflow (fully open condition) between the grooves 124, 125.

FIG. 19 shows the condition of the grooves 124, 125 and the apertures 126, 128 when the first disc 112 has been rotated with respect to the second disc 113. In this case, the first groove 124a is positioned between the first and second grooves 125a, 125b of the second disc 113. The other grooves 124 in the first disc 112 are similarly positioned between the grooves 125 in the second disc 113. In this position no air can travel between the first and second discs 112, 113. Thus, FIG. 19 illustrates the neutral or fully closed position. In this position the vacuum actuators 41, 41 shown in FIG. 16, are not actuated at all.

FIG. 20 shows another relative position of the first disc 112 with respect to the second disc 113. In this case, the first groove 124a of the first disc 112 is positioned partially overlapping the first groove 125a of the second disc 113. It should be noted that the apertures 126 similarly partially overlap the apertures 128. The other grooves 124 are similarly positioned with respect to the grooves 125 in the second disc 113. It should be noted that in this condition the air flow between the first and second disc 112, 113 is a partial flow. By a partial flow it is meant that the flow rate of air through the apertures 126, 128 is not the full flow conditions shown in FIG. 18 but are greater than the zero flow condition shown in FIG. 19. Thus it can be understood that the activating means 110 of this invention provides for variable air flow and thereby variable activation of the first and second vacuum actuators 40, 41 as shown in FIG. 16. Of course, there are infinite relative positions for the first disc 112 with respect to the second disc 113. For example, the first groove 124a in the first disc 112 may be positioned directly over the second groove 125b in the second disc 113. In this condition the first bore 140 in the first lid 134 communicates with the second bore 143 in the second lid 135.

Figure 15:
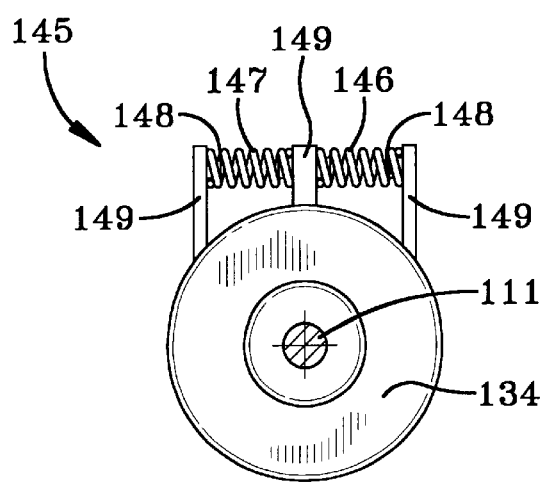
FIG. 15 is a plan view taken along the line 15—15 of FIG. 10 showing the biasing means used to bias the discs into a neutral position.

With reference now to FIGS. 10 and 15, it should be noted that in the preferred embodiment this invention includes biasing means 145 for biasing the first disc 112 into the neutral position shown in FIG. 19 with respect to the second disc 113. Any biasing means chosen with sound engineering judgement can be used with this invention. However, in the preferred embodiment the biasing means 145 is accomplished using first and second springs 146, 147. In particular it should be noted that two spring arms 149 extend radially from the first disc 112. A single spring arm 149 extends radially from the second disc 113 and is positioned between the spring arms of the first disc 112. As shown in FIG. 15, the first spring 146 is positioned between one of the spring arms 149 of the first disc 112 and the spring arm 149 of the second disc 113. Similarly the second spring 147 is positioned between the other spring arm 149 in the first disc 112 and the spring arm 149 on the second disc 113. The first and second springs 146, 147 can be held in place between the spring arms 149 by any means chosen with sound engineering judgement such as using a bolt. In the preferred embodiment, however, the spring arms have spring nubs 148 sized to receive the first and second springs 146, 147 as shown in FIG. 15. Thus, the biasing means 145 biases the first and second discs 112, 113 into the relative position that they are given when assembled. In the preferred embodiment, this assembled position is the neutral or fully closed position illustrated in FIG. 19.

Figure 17:
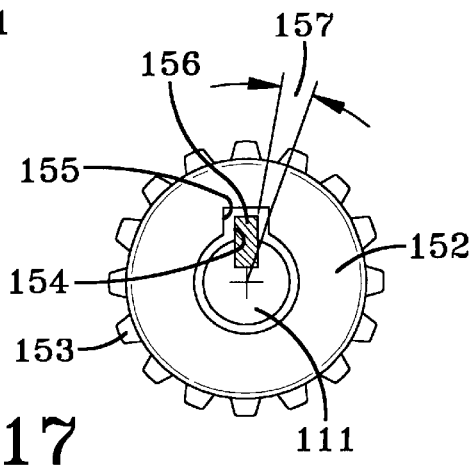
FIG. 17 is a bottom view taken along the line 17—17 of FIG. 10 showing how the gear is playably connected to the steering rod.

Referring now to FIGS. 1, 10 and 17, it should be noted that the first disc 112 is moved with respect to the second disc 113 by the steering rod 111. Preferably the first disc 112 and the first lid 134 are fixedly connected to the steering rod 111. This can be accomplished by any means known in the art such as pinning the first disc to the steering rod 111. The second disc 113 and the second lid 135 are playably connected to the steering rod 111 in any manner chosen with sound engineering judgment. Preferably the second lid 135 is fixedly connected to a gear 152. The gear 152 is playably connected to the steering rod 111 using a key 156. The key 156 fits tightly within a key-way 154 in the steering rod 111. The key 156 also fits within a key-way 155 in the gear 152. However, the key-way 155 is sized such that the key 156 does not fit snuggly therein but rather there is room or play between the key 156 and the outer edges of the key way 155. Thus, when the steering rod 111 is turned the gear 152 will not immediately turn with the steering rod 111. However, once the steering rod 111 has been turned a predetermined amount (the play angle 157), the key 156 will contact the key-way 155 and further turning of the steering rod 11 will also turn the gear 152. Of course other means for playably connecting the second disc 113 and the second lid 135 to the steering rod 111 are possible with this invention. These other means include playably splinning the steering rod 111 to the gear 152. It is important that the steering rod 111 be operatively connected to the gear 152 independent of the vacuum actuators 40, 41. This is true because should the activating means 110 be inoperative for any reason (such as a cut vacuum line or if the engine 14 was turned off) the riding mower 10 could still be turned by the steering implement 21.

With reference now to FIGS. 10–11 and 16–17, an important aspect of this invention is the interplay of the groove angle 127 shown in FIG. 11 and the play angle 157 shown in FIG. 17. As explained above, the groove angle 127 determines the amount of rotation of the steering rod 111 required to move the first disc 112 with respect to the second disc 112 from a fully closed or neutral condition (shown in FIG. 19) to a fully open condition (shown in FIG. 18). Between the fully open and fully closed conditions any number of partially open conditions (such as the condition shown in FIG. 20) are possible. The play angle 157 thus permits the steering rod 111 to begin activating the vacuum actuators 40, 41 before the steering rod 111 physically contacts the gear 152. Preferably, the play angle 157 is within the range of the groove angle 127 thereby permitting the activation of the vacuum actuators before the steering rod 111 directly rotates the gear 152 yet also permitting the steering rod 111 to directly contact the gear 152 before the total extent of the groove angle 127 has been reached. Most preferably, the play angle 157 is between 3 and 10°.

With reference now to FIGS. 10 and 16, the power assist means 150 of this invention preferably includes the gear 152 having gear teeth 153 as well as a gear plate 158 which can be of any type commonly known in the art. The gear plate 158 has first and second sides 159, 160 and a gear portion 161 that operatively connects to the gear teeth 153 of the gear 152 in a manner commonly known in the art. The gear plate 158 pivots about a pivot point 162. The gear plate 158 is operatively connected to the steering mechanism 31 in any manner known in the art.

With reference now to FIGS. 10–20, the operation of the power assist steering system 100 will now be described. It should first be noted that before the power assist steering system 100 is operated the first and second discs 112, 113 are in the neutral positions with respect to each other as shown in FIG. 19. When the operator desires to turn the riding mower 10 the steering implement 21 is adjusted or turned in a manner commonly known in the art. This motion causes the steering rod 111 to rotate thereby rotating the first disc 112 with respect to the second disc 113. This motion causes either the first or second spring 146, 147 (depending on the direction being turned) to compress. As the first disc 112 is moved with respect to the second disc 113 the grooves 124 begin to overlap the grooves 125. This communicates the vacuum means 24 through the second bore 141 of the first lid 134 and the second channel 121 of the first disc 112 through either the first channel 122 of the second disc 113, through the first bore 142 of the second lid 135 and on to the second vacuum actuator 41 or through the second channel 123 of the second disc 113, through the second bore 143 of the second lid 135 and on to the first vacuum actuator 40 (depending on the direction the operator is turning). Simultaneously, atmospheric air is communicated through the first bore 140 of the first lid 134 and the first channel 120 of the first disc 112 through either the second charnel 123 of the second disc 113, through the second bore 143 of the second lid 135 and on to the first vacuum actuator 40 or through the first channel 122 of the second disc 113, through the first bore 142 of the second lid 135 and on to the second vacuum actuator 41.

With continuing reference to FIGS. 10–20, depending on the particular position of the first disc 112 with respect to the second disc 113 a vacuum is drawn in either the first vacuum actuator 40 or the second vacuum actuator 41. When a vacuum is drawn within the first vacuum actuator 40 the first connector link 42 pulls on the first side 159 of the gear plate 158 and this motion is then transmitted through the steering mechanism 31 to the first wheel 15 thereby turning the riding mower in a first direction 78. When a vacuum is, on the other hand, drawn in the second vacuum actuator 41, the gear plate 158 is pulled by the second connector link 43 and this motion is transmitted through the steering mechanism 31 to the first wheel 15 thereby turning the riding mower 10 in the second direction 79.

With reference now to FIGS. 16 and 18–20, it should be noted that the degree of turn that the operator inputs to the steering implement 21 directly varies or controls the amount of power assist that the steering system receives from the power assist steering system 100. Thus, if the operator turns the steering implement 21 a slight amount, the grooves 124, 125 would be aligned as shown in FIG. 20. This would permit partial air flow thereby causing the vacuum actuators 40, 41 to lightly assist the gear plate 158. Should, on the other hand, the operator turn the steering implement 21 to a greater degree, the grooves 124 would line up with the grooves 125 as shown in FIG. 18. This condition provides the maximum help to the operator thereby permitting the maximum air flow to the first and second vacuum actuators 40, 41. When the operator stops turning the steering implement 21 the biasing means 145 returns the first and second discs 112, 113 into the neutral position shown in FIG. 19. In this condition no help is provided by the vacuum actuators 40, 41 to the steering mechanism 31.

The invention has been described with reference to preferred embodiments. Obviously, modifications and alterations will occur to others upon a reading and understanding of this specification. It is intended to include all such modifications and alternations in so far as they come within the scope of the appended claims or the equivalence thereof.

Having thus described the invention, it is now claimed:

1. A power assist steering system for use on a vehicle, the vehicle having a steering implement and a steering mechanism operatively connected to a first wheel, said power assist steering system comprising:

a first vacuum actuator;

vacuum means for providing a vacuum to said first vacuum actuator;

power assist means for assisting the steering mechanism in turning the first wheel, said power assist means being operatively connected to said first vacuum actuator; and, activating means for selectively variably activating said first vacuum actuator, said activating means comprising,
  A) a steering rod selectively rotatable by the steering implement;
  B) a first disc fixedly connected to said steering rod, said first disc having a first side surface with first and second channels and a second side surface with at least first and second grooves, said first disc also having a first aperture that communicates said first channel to said first groove and a second aperture that communicates said second channel to said second groove; and,
  C) a second disc identically shaped and sized to said first disc and operatively connected to said power assist means, said second disc having a first side surface with first and second channels and a second side surface with at least first and second grooves, said first and second channels of said second disc being identically shaped and sized to said first and second channels of said first disc, and said at least first and second grooves of said second disc being identically shaped and sized to said first and second grooves of said first disc, said second disc also having a first aperture that communicates said first channel to said first groove, and a second aperture that communicates said second channel to said second groove, said first and second discs for use in varying the vacuum to said first vacuum actuator as said first disc is moved with respect to said second disc by said steering rod.

2. A power assist steering system for use on a vehicle, the vehicle having a steering implement and a steering mechanism operatively connected to a first wheel, said power assist steering system comprising:

a first vacuum actuator;

vacuum means for providing a vacuum to said first vacuum actuator;

power assist means for assisting the steering mechanism in turning the first wheel, said power assist means being operatively connected to said first vacuum actuator; and, activating means for selectively variably activating said first vacuum actuator, said activating means comprising,
  A) a steering rod selectively rotatable by the steering implement;
  B) a first disc fixedly connected to said steering rod, said first disc having a first side surface with first and second channels and a second side surface with at least first and second grooves, said first and second grooves are spaced apart by a groove angle between 1° and 15°, said first disc also having a first aperture that communicates said first channel to said first groove and a second aperture that communicates said second channel to said second groove; and,
  C) a second disc operatively connected to said power assist means, said first and second discs for use in varying the vacuum to said first vacuum actuator as said first disc is moved with respect to said second disc by said steering rod.

3. A power assist steering system for use on a vehicle, the vehicle having a steering implement and a steering mechanism operatively connected to a first wheel, said power assist steering system comprising:

a first vacuum actuator;

vacuum means for providing a vacuum to said first vacuum actuator;

power assist means for assisting the steering mechanism in turning the first wheel, said power assist means being operatively connected to said first vacuum actuator;

activating means for selectively variably activating said first vacuum actuator, said activating means comprising,
A) a steering rod selectively rotatable by the steering implement;
B) a first disc fixedly connected to said steering rod, said first disc having a first side surface with first and second channels and a second side surface with at least first and second grooves, said first disc also having a first aperture that communicates said first channel to said first groove and a second aperture that communicates said second channel to said second groove; and,
C) a second disc operatively connected to said power assist means, said first and second discs for use in varying the vacuum to said first vacuum actuator as said first disc is moved with respect to said second disc by said steering rod; and, biasing means for biasing said first disc into a neutral position with respect to said second disc, wherein said biasing means comprises:

first and second spring arms extending from said first disc;

a first spring arm extending from said second disc positioned between said first and second spring arms of said first disc; and, first and second springs, said first spring being positioned between said first spring arm of said first disc and said first spring arm of said second disc, said second spring being positioned between said second spring arm of said first disc and said first spring arm of said second disc.

4. A power assist steering system for use on a vehicle, the vehicle having a steering implement and a steering mechanism operatively connected to a first wheel, said power assist steering system comprising:

a first vacuum actuator;

vacuum means for providing a vacuum to said first vacuum actuator;

activating means for selectively variably activating said first vacuum actuator, said activating means comprising,
A) a steering rod selectively rotatable by the steering implement;
B) a first disc fixedly connected to said steering rod, said first disc comprising a first side surface comprising an outer annular channel (120) and an inner annular channel (121) and a second side surface comprising at least first and second grooves, said at least first and second grooves being radially aligned;
C) a second disc operatively connected to said first vacuum actuator and the steering mechanism, said first and second discs for use in varying the vacuum to said first vacuum actuator as said first disc is moved with respect to said second disc by said steering rod; and,
D) wherein said channels and grooves are recessed within, but do not fully pass through said first disc.

5. The power assist steering system of claim 4 further comprising:

a first aperture that communicates said outer annular channel to said first groove; and, a second aperture that communicates said inner annular channel to said second groove.

6. The power assist steering system of claim 5 wherein said outer annular channel (120) is communicated with alternating grooves via alternating apertures.

7. The power assist steering system of claim 5 wherein said inner annular channel (121) is communicated to alternating grooves via alternating apertures.

8. The power assist steering system of claim 5 wherein said second disc comprises a first side surface comprising an outer annular channel and an inner annular channel and a second side surface comprising at least first and second grooves.

9. The power assist steering system of claim 8 wherein said second side surface (115) of said first disc faces said second side surface (117) of said second disc.

* * * * *